(12) United States Patent
Suzuki

(10) Patent No.: US 9,056,989 B2
(45) Date of Patent: Jun. 16, 2015

(54) INSULATING SILICONE RUBBER COMPOSITION

(71) Applicant: TOKAI RUBBER INDUSTRIES, LTD., Komaki-shi, Aichi-ken (JP)

(72) Inventor: Satoshi Suzuki, Komaki (JP)

(73) Assignee: SUMITOMO RIKO COMPANY LIMITED, Komaki-shi (JP)

(*) Notice: Subject to any disclaimer, the term of this patent is extended or adjusted under 35 U.S.C. 154(b) by 0 days.

(21) Appl. No.: 14/062,486

(22) Filed: Oct. 24, 2013

(65) Prior Publication Data
US 2014/0051788 A1  Feb. 20, 2014

Related U.S. Application Data

(63) Continuation of application No. PCT/JP2012/071610, filed on Aug. 27, 2012.

(30) Foreign Application Priority Data

Mar. 23, 2012 (JP) ................................ 2012-066782

(51) Int. Cl.
| | |
|---|---|
| C08L 83/04 | (2006.01) |
| C08K 5/544 | (2006.01) |
| H01B 3/46 | (2006.01) |
| C09D 7/12 | (2006.01) |
| C08K 5/541 | (2006.01) |

(52) U.S. Cl.
CPC .............. *C09D 7/1233* (2013.01); *C08K 5/541* (2013.01); *C08K 5/5442* (2013.01); *C08K 5/544* (2013.01); *C08L 83/04* (2013.01); *H01B 3/46* (2013.01)

(58) Field of Classification Search
None
See application file for complete search history.

(56) References Cited

U.S. PATENT DOCUMENTS

| | | | |
|---|---|---|---|
| 2002/0198100 A1 | 12/2002 | Mehnert et al. | |
| 2007/0021615 A1 | 1/2007 | Kohler et al. | |
| 2011/0039991 A1 | 2/2011 | Iijima et al. | |
| 2013/0142548 A1* | 6/2013 | Suzuki et al. ................. | 399/286 |

FOREIGN PATENT DOCUMENTS

| | | |
|---|---|---|
| CN | 102254696 A | 11/2011 |
| EP | 393 511 A2 * | 12/1990 |
| JP | 2005-298661 A | 10/2005 |
| JP | 2005-344102 A | 12/2005 |
| JP | 2005-350579 A | 12/2005 |
| JP | 2006-225422 A | 8/2006 |
| JP | 2007-501815 A | 2/2007 |
| JP | 2007-321115 A | 12/2007 |
| JP | 2011-148641 A | 8/2011 |
| WO | 02/098560 A1 | 12/2002 |
| WO | 2009/084730 A1 | 7/2009 |
| WO | 2012/043303 A1 | 4/2012 |
| WO | WO 2012/043303 * | 4/2012 |

OTHER PUBLICATIONS

Entitled "Combinatorial Materials Research Applied to the Development of New Surface Coatings XV: An Investigation of Polysiloxane Anti-Fouling/Fouling Release Coatings Containing Tethered Quaternary Ammonium Salt Groups" authored by Chisholm et al. and published in ACS Combinatorial Science (2011), 13, 298-309.*
Product data for Octadecyldimethyl[3-(trimethoxysilyl)propyl]ammonium chloride from LookChem website.*
International Search Report dated Dec. 11, 2012, issued in corresponding application No. PCT/JP2012/071610.

* cited by examiner

*Primary Examiner* — Marc Zimmer
(74) *Attorney, Agent, or Firm* — Westerman, Hattori, Daniels & Adrian, LLP

(57) ABSTRACT

An insulating silicone rubber composition superior in reliability is provided that has excellent antistatic property while being free from bleeding, blooming, and discoloration. The insulating silicone rubber contains silicone rubber, ionic liquid having an alkoxysilyl group, and preferably a crosslinking agent. The content of the ionic liquid is preferably within a range from 0.001 to 5 parts by mass with respect to 100 parts by mass of the total amount of the silicone rubber and the crosslinking agent.

20 Claims, No Drawings

INSULATING SILICONE RUBBER COMPOSITION

TECHNICAL FIELD

The present invention relates to a silicone rubber composition, and more particularly, to an insulating silicone rubber composition with excellent antistatic property.

BACKGROUND ART

Silicone rubber has been used for a variety of materials in many fields because of its excellent weather resistance, electrical characteristics, low permanent compression set, heat resistance, cold resistance, and so on. For example, silicone rubber is used in a keypad, a gasket, a rubber vibration isolator, a sealing material, a packing material, and a food container.

In General, silicone rubber is supplied in the form of a composition containing organopolysiloxane and fillers such as silica. Since these materials are insulating materials, it is problem that the cured moldings of them are easy to charge when no conducting material is added.

Therefore, Patent Document 1 proposes to improve antistatic performance of an insulating silicone rubber composition by adding a certain ion conductive antistatic agent to a heat-curable silicone rubber composition. Patent Document 2 also proposes to improve antistatic performance of a heat curable silicone rubber composition by adding a certain ionic material to heat curable silicone rubber.

CITATION LIST

Patent Literature

PTL1: JP 2006-225422 A
PTL2: WO 2009/084730 A1

SUMMARY OF INVENTION

Technical Problem

However, the insulating silicone rubber composition described in Patent Document 1 is inferior in reliability because it has a problem that the bleeding or blooming of the ion-conductive antistatic agent easily occurs. The heat-curable silicone rubber composition described in Patent Document 2 also has a problem that the secondary curing easily discolors it.

The present invention has been made in view of the above circumstances, and an object thereof is to provide an insulating silicone rubber composition superior in reliability that has excellent antistatic property while being free from bleeding, blooming, and discoloration.

Solution to Problem

In order to solve the above problems, an insulating silicone rubber composition of the present invention is required to contain a silicone rubber and an ionic liquid having an alkoxysilyl group.

It is preferable that the volume resistivity of the insulating silicone rubber composition is $1 \times 10^{10}$ Ω·cm or more.

It is preferable that the cationic component of the above-mentioned ionic liquid is that shown in the following formula (1).

[Chem. 1]

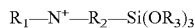

(1)

where:
$R_1$: a cyclic or liner organic group
$R_2$: contains at least $(CH_2)_n$ (where n is an integer number)
$R_3$: an alkyl group It is preferable that the insulating silicone rubber composition further contains a crosslinking agent.

It is preferable that the content of the above-mentioned ionic liquid is within a range from 0.001 to 5 parts by mass with respect to 100 parts by mass of the total amount of the silicone rubber and the crosslinking agent.

Advantageous Effects of Invention

According to the insulating silicone rubber composition of the present invention, the ionic liquid added to the silicone rubber has an alkoxysilyl group and has excellent compatibility with silicone rubber, so bleeding and blooming of the ionic liquid can be inhibited. The ionic liquid also has excellent heat resistance, so the discoloration by secondary curing can also be inhibited. Thus, excellent antistatic property is exerted without causing bleeding and blooming of an ionic liquid added to the silicone rubber and discoloration.

If the cationic component of the ionic liquid is that shown in the above formula (1), the compatibility with silicone rubber and the heat resistance of the ionic liquid becomes farther excellent, and excellent antistatic property is exerted without causing bleeding and blooming of an ionic liquid and discoloration.

DESCRIPTION OF EMBODIMENTS

Hereinafter, a detailed description of the insulating silicone rubber composition of the present invention will be provided.

The insulating silicone rubber composition of the present invention comprises a silicone rubber and a specific ionic liquid.

A generally known organopolysiloxane can be used as the silicone rubber. The silicone rubber may be a liquid rubber and also may be a millable rubber. A liquid rubber is preferable from the viewpoint of dimensional accuracy and others.

An organopolysiloxane has an organic group. The organic group is a monovalent substituted or unsubstituted hydrocarbon group. The unsubstituted hydrocarbon group includes an alkyl group such as a methyl group, ethyl group, propyl group, butyl group, hexyl group, and dodecyl group, an aryl group such as a phenyl group, and an aralkyl groups such as a β-phenylethyl and β-phenylpropyl group. The substituted hydrocarbon group includes a chloromethyl, 3,3,3-trifluoropropyl group, and others. Generally, the organopolysiloxane having a methyl group as the organic group is frequently used because of the ease of synthesis. The form of the organopolysiloxane is preferably straight-line, but it may also be branched or cyclic.

An organopolysiloxane has a specific reactive group (functional group) according to its crosslinking structure (curing mechanism). The reactive group includes an alkenyl group (such as a vinyl group, an allyl group, a butenyl group, a pentenyl group, and a hexenyl group) and a silanol group. The organopolysiloxane having an alkenyl group is crosslinked by peroxide crosslinking reaction by an organic peroxide as a crosslinking agent, or is crosslinked by addition reaction by an organopolysiloxane having a hydrosilyl group (organohydrogen polysiloxane) as a crosslinking agent. A hydrosilylation catalyst may be used in combination for the addition reaction. The organopolysiloxane having the silanol group is crosslinked by the condensation reaction. A condensation crosslinking agent may be used in combination for the condensation reaction.

It is preferable that the organopolysiloxane having an alkenyl group contains at least 2 alkenyl groups in one molecule. It is preferable that the organopolysiloxane having a hydrosilyl group contains at least 2 hydrosilyl groups in one molecule. It is preferable that the organopolysiloxane having a silanol group contains at least 2 silanol groups in one molecule.

The organic peroxide includes benzoyl peroxide, 2,4-dichlorobenzoyl peroxide, p-methylbenzoyl peroxide, o-methylbenzoyl peroxide, dicumyl peroxide, cumyl-t-butyl peroxide, 2,5-dimethyl-2,5-di-t-butylperoxy hexane, and di-t-butyl peroxide. Among these peroxides, dicumyl peroxide, cumyl-t-butyl peroxide, 2,5-dimethyl-2,5-di-t-butylperoxy hexane, and di-t-butyl peroxide are more preferable since they provide particularly lower permanent compression set.

Although the addition amount of the organic peroxide is not limited in particular, in general, it is within a range from 0.1 to 10 parts by mass with respect to 100 parts by mass of organopolysiloxane having an alkenyl group.

Specific examples of the organopolysiloxane having a hydrosilyl group (organohydrogen polysiloxane) include both end trimethylsiloxy group-blocked methylhydrogen polysiloxane, both end trimethylsiloxy group-blocked dimethylsiloxane-methylhydrogen siloxane copolymers, both end dimethylhydrogensiloxy group-blocked dimethylpolysiloxane, both end dimethylhydrogensiloxy group-blocked dimethylsiloxane-methylhydrogensiloxane copolymers, both end trimethylsiloxy group-blocked methylhydrogen siloxane-diphenylsiloxane copolymers, both end trimethylsiloxy group-blocked methylhydrogensiloxane-diphenylsiloxane-dimethylsiloxane copolymers, copolymers having $(CH_3)_2HSiO1/2$ units and $SiO4/2$ units, and copolymers having $(CH_3)_2HSiO1/2$ units, $SiO4/2$ units, and $(C_6H_5)SiO3/2$ units.

Although the blending amount of the organopolysiloxane having a hydrosilyl group is not limited in particular, in general, it is within a range from 0.1 to 40 parts by mass with respect to 100 parts by mass of organopolysiloxane having an alkenyl group.

A hydrosilylation catalyst includes platinum-based catalyst, such as particulate platinum, platinum black, platinum-supported activated carbon, platinum-supported silica, chloroplatinic acid, an alcohol solution of chloroplatinic acid, an olefin complex of platinum, and an alkenylsiloxane complex of platinum.

Although the addition amount of the hydrosilylation catalyst is not limited in particular, in general, in terms of a metal amount of platinum metal, it is within a range from 1 ppm to 1 parts by mass with respect to 100 parts by mass of organopolysiloxane having an alkenyl group.

A silane having 2 or more, preferably 3 or more, hydrolyzable groups in one molecule or its partially hydrolyzed condensate are used as the condensation crosslinking agent. The hydrolyzable group includes an alkoxy group such as a methoxy group, ethoxy group, and butoxy group, a ketoxime group such as a dimethylketoxime group and methylethylketoxime group, an acyloxy group such as an acetoxy group, an alkenyloxy group such as an isopropenyloxy group and isobutenyloxy group, an amino group such as a N-butylamino group and N,N-diethylamino group, and an amide group such as a N-methylacetamide group.

Although the addition amount of the condensation crosslinking agent is not limited in particular, in general, it is within a range from 1 to 50 parts by mass with respect to 100 parts by mass of organopolysiloxane having an silanol group.

The specific ionic liquid has excellent compatibility with silicone rubber since it has an alkoxysilyl group. The alkoxysilyl group may be contained in the cationic structure of the ionic liquid or also may be contained in the anionic structure of the ionic liquid. The ionic liquid having the alkoxysilyl group in the cationic structure is more preferable.

The ionic liquid having an alkoxysilyl group includes the one having cation (positive ion) that shown in the following formula (1).

[Chem. 2]

$$R_1—N^+—R_2—Si(OR_3)_3 \quad (1)$$

where:
$R_1$: a cyclic or liner organic group
$R_2$: contains at least $(CH_2)_n$ (where n is an integer number)
$R_3$: an alkyl group In the formula (1), $R_1$—N is only required to be an ammonium compounds. When $R_1$ is a cyclic organic group, $R_1$—N includes a nitrogen-containing heterocyclic compound, such as a five-membered ring (e.g., pyrrole, pyrrolidine, and imidazole), a six-membered ring (e.g., pyridine and pyrimidine), and a fused ring of a pyrimidine ring and an imidazole ring (e.g., indole, quinoline, isoquinoline, and purine). These ring structures may contain oxygen, sulfur, and the like in addition to nitrogen.

In the formula (1), $R_1$—N may be an aliphatic hydrocarbon group having 1 to 18 carbon atoms (includes an unsaturated bond) other than ring structure. Specifically, it includes the quaternary ammonium salt in the following formula (2).

[Chem. 3]

$$(2)$$

In the formula (2), $R_4$ is an aliphatic hydrocarbon group having 1 to 18 carbon atoms (e.g. —$C_8H_{17}$), $R_5$ and $R_6$ are an alkyl group having 1 to 4 carbon atoms.

In the formula (1), $R_2$ contains at least a methylene group $(CH_2)_n$. The number of methylene groups is preferably within a range from 1 to 18. $R_2$ may contain functional groups such as a urethane group, an ester group, an amide group, an amino group, a thioether group, a hydroxyl group, and an aromatic ring in addition to a methylene group.

In the formula (1), $R_3$ is an alkyl group. The alkyl group may be a straight-chain alkyl group, and also may be a branched alkyl group. The number of carbon atoms of the alkyl group is preferably within a range from 1 to 4.

An anion, which is a counter ion of a cation having an alkoxysilyl group, is not limited in particular. The anion includes $AlCl_4$—, $Al_2C_7$—, $NO_3$—, $BF_4$—, $PF_6$—, $CH_3COO$—, $CF_3COO$—, $CF_3SO_3$—, $(CF_3SO_2)_3C$—, $AsF_6$—, $SbF_6$—, $F(HF)n$-, $CF_3CF_2CF_2CF_2SO_3$—, $(CF_3CF_2SO_2)_2N$—, $CF_3CF_2CF_2COO$—, bis(trifluoromethane sulfonyl), an imide anion $[(CF_3SO_2)_2N$—](TFSI).

The following formulas (3) to (10) are the examples that show more specific structures of an ionic liquid having an alkoxysilyl group.

The content of a specific ionic liquid is preferably within a range from 0.001 to 5 parts by mass with respect to 100 parts by mass of the total amount of silicone rubber and a crosslinking agent, more preferably within a range from 0.01 to 1 parts by mass. When the content of the specific ionic liquid is within the more preferable range, they show excellent antistatic property and economic efficiency.

The insulating silicone rubber composition of the present invention may contain additives that are generally added to an insulating silicone rubber composition in addition to silicone rubber and specific ionic liquid to the extent that they does not impair the invention. The available additives includes filler, a crosslinking accelerator, a crosslinking retarder, a crosslinking auxiliary, an antiscorching agent, an antioxidant, a softener, a heat stabilizer, flame retardant, a flame-retardant auxiliary, an ultraviolet light absorber, and anticorrosive.

The filler includes reinforcing filler, such as fumed silica, crystalline silica, wet silica, and fumed titanium oxide. These reinforcing fillers may be subjected to surface modification with an organic silicon compound, such as an organoalkoxysilane, an organohalosilane, an organosilazane, a diorganosiloxane oligomer in which both ends of the molecular chain are blocked with silanol groups, and a cyclic organosiloxane from the viewpoint that reinforcing fillers are easy to be dispersed in silicone rubber, and others.

Although the addition amount of the reinforcing fillers is not limited in particular, preferably within a range from 1 to 50 parts by mass with respect to 100 parts by mass of an organopolysiloxane having an alkenyl group or an organopolysiloxane having a silanol group.

It is preferable that the insulating silicone rubber composition of the present invention does not contain a conductive substance having electronic conductivity such as carbon black in that the insulating silicone rubber composition of the present invention is electric non-conductance. However, this does not mean to preclude the silicone rubber composition of the present invention from containing a conductive substance. For example, when the addition amount is so small that it hardly affects the conductivity, a conductive substance can be contained. The above-mentioned ionic liquid is not for expressing the conductivity of a silicone rubber composition but for improving its antistatic property. For this reason, volume resistivity of the insulating silicone rubber composition of the present invention is preferably $1 \times 10^{10}$ Ω·cm or more. The volume resistivity of a silicone rubber composition is measured under the condition of applied voltage of 100 V according to JIS K6911.

The insulating silicone rubber composition of the present invention can be prepared, for example, as follows: That is, in the case where liquid silicone rubber is used, the preparation can be performed by mixing the liquid silicone rubber and various additives such as a reinforcing filler to be added as necessary (excluding an ionic liquid, a crosslinking agent, and a catalyst) using a planetary mixer, a Henschel mixer, a Ross mixer, a Hobart mixer, a kneader mixer, or the like, and then adding an ionic liquid, and a crosslinking agent and a catalyst as necessary to the mixture, followed by kneading with a planetary mixer, a Henschel mixer, a Ross mixer, a Hobart mixer, a kneader mixer, a roll, or the like. In the preparation method described above, the ionic liquid, the crosslinking agent, and the catalyst may be added during the first mixing process.

On the other hand, in the case where a millable silicone rubber is used, preparation can be performed by kneading the millable silicone rubber, anionic liquid, and various additives such as a reinforcing filler and a catalyst to be added as necessary (excluding a crosslinking agent) using a kneader mixer, a roll, or the like, and then adding a crosslinking agent or a retarder such as 1-ethynyl-1-cyclohexanol as necessary to the mixture, followed by kneading with a roll or the like. In the preparation method described above, the crosslinking agent may be added during the first kneading process.

An insulating silicone rubber molding is obtained by heat-curing the insulating silicone rubber composition of the present invention. As the method of molding, specific molding methods are selectable according to desired form and size. Concretely, the molding methods include cast molding, injection molding, compression molding, calendar molding, extrusion molding, coating, and screen printing.

The curing conditions are not limited in particular, they are selectable according to the physical properties of the desired molding. In general, The curing condition is for a few seconds to around 2 weeks at a temperature of 20 to 450 degrees C.

It is preferable that the obtained insulating silicone rubber molding is subjected to secondary curing in a particular condition. The secondary curing can lower permanent compression set of the molding, reduce the amount of low-molecular-weight siloxane component that exists in the silicone rubber, remove decomposition products of the organic peroxide, and others. The condition of the secondary curing is preferably at 200 degrees C. or more, more preferably at 200 to 250 degrees C., and preferably for 1 hour or more at a prescribed temperature, more preferably for 1 to 10 hours.

According to the insulating silicone rubber composition of the present invention, since the ionic liquid added to the silicone rubber has an alkoxysilyl group that provides excellent compatibility with silicone rubber, bleeding or blooming of the ionic liquid can be inhibited. This ionic liquid has excellent heat resistance, so the discoloration by the secondary curing can also be inhibited. Therefore, the insulating silicone rubber composition of the present invention exerts excellent antistatic property without causing bleeding and blooming of the ionic liquid added to the silicone rubber, and also without causing discoloration. The compatibility with silicone rubber and the heat resistance are especially excellent when the cationic component of the ionic liquid is that shown in the above formula (1).

EXAMPLES

Hereinafter, a detailed description of the present invention will be provided with reference to the examples.

Example 1 to 10

According to the formulation shown in Table 1, a liquid silicone rubber composition was prepared as follows: first, compounding liquid silicone rubber (vinyl group-containing dimethylpolysiloxane <1>), fumed silica, crystalline silica, a platinum catalyst, and ionic liquid having an alkoxysilyl group, then blending the mixture with a planetary mixer for 30 minutes, then adding a crosslinking agent (hydrosilyl group-containing dimethylpolysiloxane) and 1-ethynyl-1-cyclohexanol to the mixture, then blending the mixture for another 30 minutes, and then degassing the mixture under reduced pressure.

Comparative Example 1

A liquid silicone rubber composition was prepared in the same manner as Example 1 except that ionic liquid without an alkoxysilyl group was used instead of the ionic liquid having an alkoxysilyl group.

Comparative Example 2

A liquid silicone rubber composition was prepared in the same manner as Example 1 except that an ionic conductive agent was used instead of the ionic liquid having an alkoxysilyl group.

Comparative Example 3

A liquid silicone rubber composition was prepared in the same manner as Example 1 except that the ionic liquid having an alkoxysilyl group was not compounded.

(Sheet Molding) A sheet of 2 mm thick was produced as follows: first, press-forming each liquid silicone rubber composition of Examples 1 to 10 and Comparative Examples 1 to 3 under the condition at a temperature of 170 degrees C. for 10 minutes, and then being subjected to secondary curing under the condition at a temperature of 200 degrees C. for 4 hours.

Examples 11 to 12

According to the formulation shown in Table 2, a liquid silicone rubber composition was prepared as follows: first, compounding liquid rubber (silanol group-containing dimethylpolysiloxane), fumed silica, a tin catalyst, and ionic liquid having an alkoxysilyl group, then blending the mixture with a planetary mixer for 30 minutes under reduced pressure, then adding a condensation crosslinking agent to the mixture, and then blending the mixture for another 30 minutes under reduced pressure.

Comparative Example 4

A liquid silicone rubber composition was prepared in the same manner as Example 11 except that ionic liquid without an alkoxysilyl group was used instead of the ionic liquid having an alkoxysilyl group.

Comparative Example 5

A liquid silicone rubber composition was prepared in the same manner as Example 11 except that an ionic conductive agent was used instead of the ionic liquid having an alkoxysilyl group.

Comparative Example 6

A liquid silicone rubber composition was prepared in the same manner as Example 11 except that the ionic liquid having an alkoxysilyl group was not compounded.

(Sheet Molding) A sheet of 2 mm thick was produced as follows: first, injecting each liquid silicone rubber composition of Examples 11 to 12 and Comparative Examples 4 to 6 into a die for molding a sheet, and then leaving the composition for 7 days to cure under the condition at a temperature of 20 degrees C. and 55% RH.

Example 13 to 14

According to the formulation shown in Table 3, a millable silicone rubber composition was prepared as follows: first, kneading millable silicone rubber (vinyl group-containing dimethylpolysiloxane <2>), fumed silica, ionic liquid having an alkoxysilyl group, and a platinum catalyst with a kneader for 15 minutes, and then kneading 1-ethynyl-1-cyclohexanol and a crosslinking agent (hydrosilyl group-containing dimethylpolysiloxane) into the mixture with two rolls.

Comparative Example 7

A millable silicone rubber composition was prepared in the same manner as Example 13 except that ionic liquid without an alkoxysilyl group was used instead of the ionic liquid having an alkoxysilyl group.

Comparative Example 8

A millable silicone rubber composition was prepared in the same manner as Example 13 except that an ionic conductive agent was used instead of the ionic liquid having an alkoxysilyl group.

Comparative Example 9

A liquid silicone rubber composition was prepared in the same manner as Example 13 except that the ionic liquid having an alkoxysilyl group was not compounded.

(Sheet Molding) A sheet of 2 mm thick was produced in the same manner as the liquid silicone rubber composition of Example 1.

Descriptions of the materials used in Examples and Comparative Examples are as follows.

<Liquid Silicone Rubber>
  vinyl group-containing dimethylpolysiloxane <1> (DMS-V35, manufactured by Gelest, Inc.)
  silanol group-containing dimethylpolysiloxane (DMS-S42, manufactured by Gelest, Inc.)
<Millable Silicone Rubber>
  vinyl group-containing dimethylpolysiloxane <2> (SF3900C, manufactured by KCC, Inc.)
  <Crosslinking Agent>
  hydrosilyl group-containing dimethylpolysiloxane (HMS-151, manufactured by Gelest, Inc.)
  condensation crosslinking agent (ethenyltris[butane-2-ylideneamino]oxy)silane, SIV9280.0, manufactured by Gelest, Inc.)
<Filler>
  fumed silica (Aerosil R972, manufactured by Nippon Aerosil Co., Ltd.)
  crystalline silica (Crystalite VX-S, manufactured by Tatsumori Co., Ltd.)
<Retarder>
  1-ethynyl-1-cyclohexanol (reagent of Tokyo Chemical Industry Co., Ltd.)
<Catalyst>
  platinum catalyst (SIP6831.2, manufactured by Gelest, Inc.)
  tin catalyst (dibutyltin dilaurate, reagent of Tokyo Chemical Industry Co., Ltd.)
  <Ionic Liquid without an Alkoxysilyl Group>
  ionic liquid <9>1-butyl-1-methylpyrrolidinium bis(trifluoromethane sulfonyl)imide (reagent of Tokyo Chemical Industry Co., Ltd.)
<Ionic Conductive Agent (Solid at Normal Temperature)>
  bis(trifluoromethane sulfonyl)imide lithium (reagent of Tokyo Chemical Industry Co., Ltd.)
<Ionic Liquid Having an Alkoxysilyl Group>
  Ionic Liquid <1>
  Under N2 atmosphere, 60 mmol of 3-methylpyridine (a reagent manufactured by Tokyo Chemical Industry Co., Ltd.) and 55 mmol of 3-chloropropyltrimethoxysilane (a reagent manufactured by Tokyo Chemical Industry Co., Ltd.) were mixed and reacted at 90 degrees C. for 72 hours. After cooling the reaction mixture, the precipitated solid was washed twice with ethyl acetate, and then ethyl acetate was removed under reduced pressure to produce 53 mmol of a compound of 3-methyl-1-trimethoxysilylpropylpyridinium chloride. The resulting compound was dissolved in acetone, and 53 mmol of bis(trifluoromethane sulfonyl)imide lithium (a reagent manufactured by Tokyo Chemical Industry Co., Ltd.) was added thereto, followed by stirring for 24 hours at room temperature. The solvent was removed under reduced pressure, and the precipitated lithium chloride was filtered to produce 40 mmol of a compound of 3-methyl-1-trimethoxysilylpropylpyridinium bis(trifluoromethanesulfonyl)imide (ionic liquid <1>).

Ionic Liquid <2>

Synthesis was performed as in the synthesis of the ionic liquid <1> except that 1-methylpiperidine (a reagent manufactured by Tokyo Chemical Industry Co., Ltd.) was used instead of 3-methylpyridine.

Ionic Liquid <3>

Synthesis was performed as in the synthesis of the ionic liquid <1> except that 4-methylmorpholine (a reagent manufactured by Tokyo Chemical Industry Co., Ltd.) was used instead of 3-methylpyridine.

Ionic Liquid <4>

Under N2 atmosphere, 60 mmol of (2-hydroxyethyl)trimethylammonium chloride (a reagent manufactured by Tokyo Chemical Industry Co., Ltd.) and 59 mmol of 3-isocyanatepropyltriethoxysilane (a reagent manufactured by Tokyo Chemical Industry Co., Ltd.) were mixed and reacted at 75 degrees C. for 48 hours. After cooling the reaction mixture, the precipitated solid was washed twice with ethyl acetate, and then ethyl acetate was removed under reduced pressure to produce 55 mmol of a compound having chloride anion of the ionic liquid <4>. The resulting compound was dissolved in acetone, and 55 mmol of bis(trifluoromethane sulfonyl)imide lithium (a reagent manufactured by Tokyo Chemical Industry Co., Ltd.) was added thereto, followed by stirring for 24 hours at room temperature. The solvent was removed under reduced pressure, and the precipitated lithium chloride was filtered to produce 45 mmol of a compound of the ionic liquid <4>.

Ionic Liquid <5>

Synthesis was performed as in the synthesis of the ionic liquid <4> except that 1-(2-hydroxyethyl)pyridinium chloride (manufactured by CHEMICALLAND21) was used instead of (2-hydroxyethyl)trimethylammonium chloride.

Ionic Liquid <6>

Under N2 atmosphere, 60 mmol of [2-(acryloyloxy)ethyl]trimethylammonium chloride (manufactured by SIGMA-ALDRICH Co.) and 59 mmol of (3-aminopropyl)trimethoxysilane (a reagent manufactured by Tokyo Chemical Industry Co., Ltd.) were mixed and reacted at 100 degrees C. for 72 hours. After cooling the reaction mixture, the precipitated solid was washed twice with ethyl acetate, and then ethyl acetate was removed under reduced pressure to produce 53 mmol of a compound having chloride anion of the ionic liquid <6>. The resulting compound was dissolved in acetone, and 53 mmol of bis(trifluoromethane sulfonyl)imide lithium (a reagent manufactured by Tokyo Chemical Industry Co., Ltd.) was added thereto, followed by stirring for 24 hours at room temperature. The solvent was removed under reduced pressure, and the precipitated lithium chloride was filtered to produce 42 mmol of a compound of the ionic liquid <6>.

Ionic Liquid <7>

Synthesis was performed as in the synthesis of the ionic liquid <6> except that (3-mercaptopropyl)trimethoxysilane (a reagent manufactured by Tokyo Chemical Industry Co., Ltd.) was used instead of (3-aminopropyl)trimethoxysilane.

Ionic Liquid <8>

Synthesis was performed as in the synthesis of the ionic liquid <6> except that (3-mercaptopropyl)trimethoxysilane (a reagent manufactured by Tokyo Chemical Industry Co., Ltd.) was used instead of (3-aminopropyl)trimethoxysilane and [2-(methacryloyloxy)ethyl]trimethylammonium chloride (a reagent manufactured by Tokyo Chemical Industry Co., Ltd.) was used instead of [2-(acryloyloxy)ethyl]trimethylammonium chloride.

The structural formulas of the ionic liquids <1> to <8> are shown in the following formulas (3) to (10).

[Chem. 4]

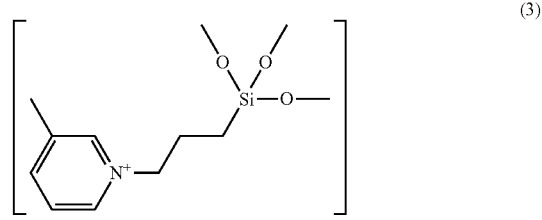

(3)

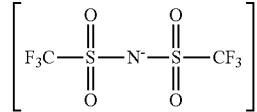

[Chem. 5]

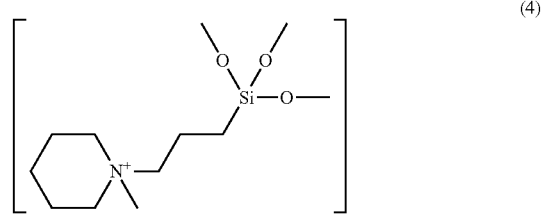

(4)

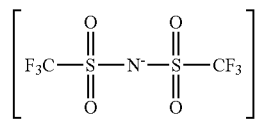

[Chem. 6]

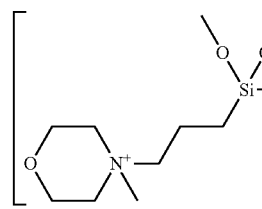

(5)

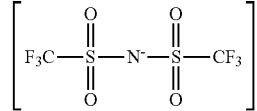

[Chem. 7]

$$\left[ \text{structure (6)} \right] \left[ F_3C-\underset{\underset{O}{\|}}{\overset{\overset{O}{\|}}{S}}-N^--\underset{\underset{O}{\|}}{\overset{\overset{O}{\|}}{S}}-CF_3 \right]$$

(6)

[Chem. 8]

$$\left[ \text{structure (7)} \right] \left[ F_3C-\underset{\underset{O}{\|}}{\overset{\overset{O}{\|}}{S}}-N^--\underset{\underset{O}{\|}}{\overset{\overset{O}{\|}}{S}}-CF_3 \right]$$

(7)

[Chem. 9]

$$\left[ \text{structure (8)} \right] \left[ F_3C-\underset{\underset{O}{\|}}{\overset{\overset{O}{\|}}{S}}-N^--\underset{\underset{O}{\|}}{\overset{\overset{O}{\|}}{S}}-CF_3 \right]$$

(8)

[Chem. 10]

$$\left[ \text{structure (9)} \right]$$

(9)

[Chem. 11]

$$\left[ \text{structure (10)} \right] \left[ F_3C-\underset{\underset{O}{\|}}{\overset{\overset{O}{\|}}{S}}-N^--\underset{\underset{O}{\|}}{\overset{\overset{O}{\|}}{S}}-CF_3 \right]$$

(10)

The following evaluations are conducted using the sheets produced.

(Volume Resistivity)

Silver paste was applied on one surface of the sheet and an electrode (with guard electrode) of 1 cm×1 cm was placed on it, and a counter electrode was placed on the other surface of the sheet. The resistance between the electrodes was measured according to JIS K6911 under the applied voltage of 100 V.

(Sheet Appearance)

The presence of discoloration of the sheet was inspected by visual observation. Considering the sheet of Comparative Example 3 as a criterion, "passed" was marked when no discoloration was observed, "failed" was marked when discoloration was observed.

(Bleed, Bloom)

The sheet was left for 2 weeks under normal temperature and normal humidity, and then the presence of bleeding or blooming of ionic liquid or ionic conductive agent on the surface of the sheet was inspected by visual observation. "passed" was marked when no bleeding and blooming was observed, "failed" was marked when bleeding or blooming was observed.

(Antistatic Property)

The surface of the sheet was electrified for 5 seconds by corona discharge of −10 kV, and then the attenuation of the surface potential was measured. "passed" was marked when the sheet required 100 seconds or less to lower the surface potential to −1V, "failed" was marked when the sheet required more than 100 seconds.

TABLE 1

| | | Examples | | | | | | |
|---|---|---|---|---|---|---|---|---|
| | Liquid silicone rubber | 1 | 2 | 3 | 4 | 5 | 6 | 7 |
| Formulation (parts by mass) | Vinyl group-containing dimethylpolysiloxane <1> | 100 | 100 | 100 | 100 | 100 | 100 | 100 |
| | Hydrosilyl group-containing dimethylpolysiloxane | 4 | 4 | 4 | 4 | 4 | 4 | 4 |

TABLE 1-continued

| | | | | | | | | |
|---|---|---|---|---|---|---|---|---|
| | Fumed silica | 5 | 5 | 5 | 5 | 5 | 5 | 5 |
| | Crystalline silica | 20 | 20 | 20 | 20 | 20 | 20 | 20 |
| | 1-ethynyl-1-cyclohexanol | 0.1 | 0.1 | 0.1 | 0.1 | 0.1 | 0.1 | 0.1 |
| | Platinum catalyst | 0.07 | 0.07 | 0.07 | 0.07 | 0.07 | 0.07 | 0.07 |
| | Ionic liquid <1> | 1.0 | — | — | — | — | — | — |
| | Ionic liquid <2> | — | 1.0 | — | — | — | — | — |
| | Ionic liquid <3> | — | — | 1.0 | — | — | — | — |
| | Ionic liquid <4> | — | — | — | 1.0 | — | — | — |
| | Ionic liquid <5> | — | — | — | — | 1.0 | — | — |
| | Ionic liquid <6> | — | — | — | — | — | 1.0 | — |
| | Ionic liquid <7> | — | — | — | — | — | — | 1.0 |
| | Ionic liquid <8> | — | — | — | — | — | — | — |
| | Ionic liquid <9> | — | — | — | — | — | — | — |
| | Ionic conductive agent (solid at normal temperature) | — | — | — | — | — | — | — |
| Physical property evaluation | Volume resistivity (Ω·cm) | $4 \times 10^{11}$ | $4 \times 10^{11}$ | $1 \times 10^{11}$ | $3 \times 10^{11}$ | $2 \times 10^{11}$ | $4 \times 10^{11}$ | $3 \times 10^{11}$ |
| | Sheet appearance | passed | passed | passed | passed | passed | passed | passed |
| | Bleed, Bloom | passed | passed | passed | passed | passed | passed | passed |
| | Antistatic property | passed | passed | passed | passed | passed | passed | passed |

| | | Examples | | | Comparative Examples | | |
|---|---|---|---|---|---|---|---|
| Liquid silicone rubber | | 8 | 9 | 10 | 1 | 2 | 3 |
| Formulation (parts by mass) | Vinyl group-containing dimethylpolysiloxane <1> | 100 | 100 | 100 | 100 | 100 | 100 |
| | Hydrosilyl group-containing dimethylpolysiloxane | 4 | 4 | 4 | 4 | 4 | 4 |
| | Fumed silica | 5 | 5 | 5 | 5 | 5 | 5 |
| | Crystalline silica | 20 | 20 | 20 | 20 | 20 | 20 |
| | 1-ethynyl-1-cyclohexanol | 0.1 | 0.1 | 0.1 | 0.1 | 0.1 | 0.1 |
| | Platinum catalyst | 0.07 | 0.07 | 0.07 | 0.07 | 0.07 | 0.07 |
| | Ionic liquid <1> | — | — | — | — | — | — |
| | Ionic liquid <2> | — | — | — | — | — | — |
| | Ionic liquid <3> | — | — | — | — | — | — |
| | Ionic liquid <4> | — | 0.001 | 5.2 | — | — | — |
| | Ionic liquid <5> | — | — | — | — | — | — |
| | Ionic liquid <6> | — | — | — | — | — | — |
| | Ionic liquid <7> | — | — | — | — | — | — |
| | Ionic liquid <8> | 1.0 | — | — | — | — | — |
| | Ionic liquid <9> | — | — | — | 1.0 | — | — |
| | Ionic conductive agent (solid at normal temperature) | — | — | — | — | 1.0 | — |
| Physical property evaluation | Volume resistivity (Ω·cm) | $4 \times 10^{11}$ | $5 \times 10^{12}$ | $5 \times 10^{10}$ | $1 \times 10^{11}$ | $6 \times 10^{10}$ | $6 \times 10^{12}$ |
| | Sheet appearance | passed | passed | passed | failed | passed | passed |
| | Bleed, Bloom | passed | passed | passed | passed | failed | passed |
| | Antistatic property | passed | passed | passed | passed | passed | failed |

Ionic liquid <1> to <8> contain alkoxysilyl groups
Ionic liquid <9> does not contain an alkoxysilyl group

TABLE 2

| | | Examples | | Comparative Examples | | |
|---|---|---|---|---|---|---|
| Liquid silicone rubber | | 11 | 12 | 4 | 5 | 6 |
| Formulation (parts by mass) | Silanol group-containing dimethylpolysiloxane | 100 | 100 | 100 | 100 | 100 |
| | Condensation crosslinking agent | 7 | 7 | 7 | 7 | 7 |
| | Fumed silica | 15 | 15 | 15 | 15 | 15 |
| | Tin catalyst | 0.07 | 0.07 | 0.07 | 0.07 | 0.07 |
| | Ionic liquid <1> | 1.0 | — | — | — | — |
| | Ionic liquid <4> | — | 1.0 | — | — | — |
| | Ionic liquid <9> | — | — | 1.0 | — | — |
| | Ionic conductive agent (solid at normal temperature) | — | — | — | 1.0 | — |
| Physical property evaluation | Volume resistivity (Ω·cm) | $5 \times 10^{11}$ | $4 \times 10^{11}$ | $2 \times 10^{11}$ | $7 \times 10^{10}$ | $7 \times 10^{12}$ |
| | Sheet appearance | passed | passed | failed | passed | passed |
| | Bleed, Bloom | passed | passed | passed | failed | passed |
| | Antistatic property | passed | passed | passed | passed | failed |

Ionic liquid <1> and <4> contain alkoxysilyl groups
Ionic liquid <9> does not contain an alkoxysilyl group

TABLE 3

| | Millable silicone rubber | Examples | | Comparative Examples | | |
|---|---|---|---|---|---|---|
| | | 13 | 14 | 7 | 8 | 9 |
| Formulation (parts by mass) | Vinyl group-containing dimethylpolysiloxane <1> | 100 | 100 | 100 | 100 | 100 |
| | Hydrosilyl group-containing dimethylpolysiloxane | 2 | 2 | 2 | 2 | 2 |
| | Fumed silica | 30 | 30 | 30 | 30 | 30 |
| | 1-ethynyl-1-cyclohexanol | 0.1 | 0.1 | 0.1 | 0.1 | 0.1 |
| | Platinum catalyst | 0.07 | 0.07 | 0.07 | 0.07 | 0.07 |
| | Ionic liquid <1> | 1.0 | — | — | — | — |
| | Ionic liquid <4> | — | 1.0 | — | — | — |
| | Ionic liquid <9> | — | — | 1.0 | — | — |
| | Ionic conductive agent (solid at normal temperature) | — | — | — | 1.0 | — |
| Physical property evaluation | Volume resistivity (Ω·cm) | $9 \times 10^{11}$ | $8 \times 10^{11}$ | $5 \times 10^{11}$ | $1 \times 10^{11}$ | $1 \times 10^{13}$ |
| | Sheet appearance | passed | passed | failed | passed | passed |
| | Bleed, Bloom | passed | passed | passed | failed | passed |
| | Antistatic property | passed | passed | passed | passed | failed |

Ionic liquid <1> and <4> contain alkoxysilyl groups
Ionic liquid <9> does not contain an alkoxysilyl group According to the result of Examples 1 to 10 and Comparative Examples 1 to 3, it was confirmed that when the ionic liquid having an alkoxysilyl group was used to the silicone rubber, the insulating silicone rubber molding exerted excellent antistatic property without causing bleeding and blooming of the ionic liquid and discoloration. The same result was obtained from Examples 11 to 12 and Comparative Examples 4 to 6, and also Examples 13 to 14 and Comparative Examples 7 to 9.

The foregoing description of the preferred embodiments and examples of the present invention has been presented only for the purposes of illustration and description; however, it is not intended to be exhaustive or to limit the invention to the precise form disclosed, and the various modifications and variations can be made in the present invention as long as they do not depart from the scope or spirit of the invention.

The invention claimed is:

1. An insulating silicone rubber composition, comprising: a silicone rubber; and
   an ionic liquid compound that comprises a heterocycle that comprises a nitrogen cation, and has an —$R_2$—Si($OR_3$)$_3$ group bonded to the nitrogen atom, where $R_2$ is a group comprising at least $(CH_2)_n$, wherein n represents an integer number; and $R_3$ is an alkyl group.

2. The insulating silicone rubber composition according to claim 1 having a volume resistivity of $1 \times 10^{10}$ Ω·cm or more.

3. The insulating silicone rubber composition according to claim 1, wherein the heterocycle is at least one selected from pyrrole, pyrrolidine, imidazole, pyridine, pyrimidine, indole, quinoline, isoquinoline and purine rings.

4. The insulating silicone rubber composition according to claim 1 further comprising a crosslinking agent.

5. The insulating silicone rubber composition according to claim 1, wherein the heterocycle that comprises the nitrogen cation comprises at least one selected from pyridine, methylpyridine, N-methylpiperidine and N-methylmorpholine.

6. The insulating silicone rubber composition according to claim 1, wherein $R_2$ further comprises a functional group selected from urethane, ester, amide, amino, thioether, hydroxyl groups and an aromatic ring.

7. The insulating silicone rubber composition according to claim 4, wherein the content of the ionic liquid is within a range from 0.001 to 5 parts by mass with respect to 100 parts by mass of the total amount of the silicone rubber and the crosslinking agent.

8. The insulating silicone rubber composition according to claim 4, wherein the content of the ionic liquid is within a range from 0.01 to 1 parts by mass with respect to 100 parts by mass of the total amount of the silicone rubber and the crosslinking agent.

9. The insulating silicone rubber composition according to claim 8, having a volume resistivity of $1 \times 10^{11}$ Ω·cm or more.

10. The insulating silicone rubber composition according to claim 1, wherein the ionic liquid comprises one or more anions selected from $AlCl_4$—, $Al_2Cl_7$—, $NO_3$—, $BF_4$—, $PF_6$—, $CH_3COO$—, $CF_3COO$—, $CF_3SO_3$—, $(CF_3SO_2)_3C$—, $AsF_6$—, $SbF_6$—, $F(HF)n$-, $CF_3CF_2CF_2SO_3$—, $(CF_3CF_2SO_2)_2N$—, $CF_3CF_2CF_2COO$— and $(CF_3SO_2)_2N$—.

11. The insulating silicone rubber composition according to claim 1, wherein the ionic liquid comprises an anion consisting of $(CF_3SO_2)_2N$—.

12. An insulating silicone rubber composition, comprising: a silicone rubber; and
   an ionic liquid compound that comprises a structure by formula (2);

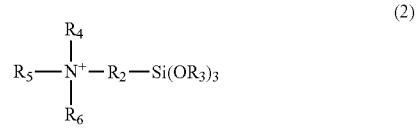

(2)

wherein $R_2$ is a group comprising at least $(CH_2)_n$, wherein n represent an integer number; $R_3$ is an alkyl group, $R_4$ is an aliphatic hydrocarbon group having 1 to 18 carbon atoms; and $R_5$ and $R_6$ are alkyl groups each having 1 to 4 carbon atoms,
wherein $R_2$ further comprises a functional group selected from urethane, ester, amide, amino, thioether, hydroxyl groups and an aromatic ring.

13. The insulating silicone rubber composition according to claim 12 having a volume resistivity of $1 \times 10^{10}$ Ω·cm or more.

14. The insulating silicone rubber composition according to claim 12, further comprising a crosslinking agent.

15. The insulating silicone rubber composition according to claim 14, wherein the content of the ionic liquid is within a range from 0.001 to 5 parts by mass with respect to 100 parts by mass of the total amount of the silicone rubber and the crosslinking agent.

16. The insulating silicone rubber composition according to claim 14, wherein the content of the ionic liquid is within a range from 0.01 to 1 parts by mass with respect to 100 parts by mass of the total amount of the silicone rubber and the crosslinking agent.

17. The insulating silicone rubber composition according to claim 16, having a volume resistivity of $1 \times 10^{11}$ $\Omega \cdot cm$ or more.

18. The insulating silicone rubber composition according to claim 12, wherein $R_4$, $R_5$ and $R_6$ are methyl groups.

19. The insulating silicone rubber composition according to claim 12, wherein the ionic liquid comprises one or more anions selected from $AlCl_4-$, $Al_2Cl_7-$, $NO_3-$, $BF_4-$, $PF_6-$, $CH_3COO-$, $CF_3COO-$, $CF_3SO_3-$, $(CF_3SO_2)_3C-$, $AsF_6-$, $SbF_6-$, $F(HF)n-$, $CF_3CF_2CF_2SO_3-$, $(CF_3CF_2SO_2)_2N-$, $CF_3CF_2CF_2COO-$ and $(CF_3SO_2)_2N-$.

20. The insulating silicone rubber composition according to claim 12, wherein the ionic liquid comprises an anion consisting of $(CF_3SO_2)_2N-$.

* * * * *